2,721,868
Patented Oct. 25, 1955

2,721,868

5-CARBOXY-2-THIAZOLYL DITHIOCARBAMATES

John J. D'Amico, Charleston, W. Va., assignor to Monsanto Chemical Company, St. Louis, Mo., a corporation of Delaware No Drawing. Application May 3, 1954,
Serial No. 427,354

10 Claims. (Cl. 260—302)

This invention relates to new compositions of matter and more particularly is directed to compounds containing the structure

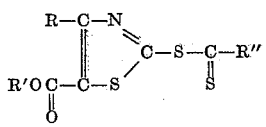

where R and R' are hydrogen or hydrocarbon radicals and R" is an amino group in which the nitrogen is attached to the

group and the remaining valences of the nitrogen are satisfied by alkyl, aralkyl or alicyclic radicals or the nitrogen is part of a closed ring heterocyclic structure. Suitable amino groups are dimethylamino, diethylamino, di-isopropylamino, dipropylamino, dibutylamino, diamylamino, methyl cyclohexylamino, methyl tetrahydrofurfurylamino, dibenzylamino, di-β-phenethylamino, morpholinyl, piperidyl and α-methylpiperidyl. In general it is preferred that R and R' be short chain alkyl radicals such as methyl, ethyl, propyl and butyl.

The following specific examples are to be understood as illustrative of the invention but in nowise limitative of the scope thereof.

EXAMPLE 1

An aqueous solution containing 203.3 grams (1.0 mole) of 5-carbethoxy-4-methyl-2-thiazolethiol [Levi, Gazz. Chem. Ital. 61, p. 723 (1931)] and 160 grams (1.0 mole) of 25% sodium hydroxide in 2000 ml. of water was prepared and to this solution was added 151.7 grams (1.0 mole) of N,N-diethylthiocarbamyl chloride over a period of 15 minutes. The mixture was stirred at 25–30° C. for two hours longer. The product was filtered off, washed with water until free from chloride, and air dried at room temperature. The 5-carboethoxy-4-methyl-2-thiazolyl diethldithiocarbamate, M. P. 64–68° C., was obtained in 88.5% yield. After recrystallization from dilute ethyl alcohol the product melted at 75–76° C. Analysis gave 8.91% nitrogen and 30.60% sulfur as compared to 8.80% nitrogen and 30.20% sulfur calculated for $C_{12}H_{18}N_2O_2S_3$.

EXAMPLE 2

To a stirred solution containing 46.8 grams (0.244 mole) of 5-carbomethoxy-4-methyl-2-thiazolethiol, 9.8 (0.244 mole) of sodium hydroxide and 388 ml. of water was added 37 grams (0.244 mole) of N,N-diethylthiocarbamyl chloride over a period of 15 minutes. The reaction mixture was stirred at 25–30° C. for one hour longer. The solid was removed by filtration, washed with water until free of chloride and air dried at room temperature. The 5-carbomethoxy-4-methyl-2-thiazolyl diethyldithiocarbamate was obtained in 75.5% yield, M. P. 64–66° C. After recrystallization from dilute methyl alcohol, it melted at 78–79° C. Analysis gave 9.47% nitrogen and 31.97% sulfur as compared to 9.20% nitrogen and 31.59% sulfur calculated for $C_{11}H_{16}N_2O_2S_3$.

EXAMPLE 3

To a stirred solution containing 231.4 grams (1.0 mole) of 5-carbobutoxy-4-methyl-2-thiazolethiol, and 160 grams (1.0 mole) of 25% sodium hydroxide in 2000 ml. of water was added 151.7 grams (1.0 mole) of N,N-diethylthiocarbamyl chloride over a period of 15 minutes. The reaction mixture was stirred for an additional two hours and then extracted with 900 ml. of ethyl ether. The ether solution was washed with water until the washings were neutral to litmus, dried over sodium sulfate and the ether removed in vacuo. The 5-carbobutoxy-4-methyl-2-thiazolyl diethyldithiocarbamate was a dark amber colored oil obtained in 78.3% yield. Analysis gave 8.30% nitrogen and 27.79% sulfur as compared to 8.08% nitrogen and 27.76% sulfur calculated for $C_{14}H_{22}N_2O_2S_3$.

The new compounds are particularly useful as accelerators for Butyl rubber. The following compositions were prepared. p-Quinone dioxime is a well known accelerator and vulcanizing agent especially recommended for this polymer.

| Stock | Parts by weight | | |
|---|---|---|---|
| | A | B | C |
| Butyl rubber | 100 | 100 | 100 |
| Carbon black | 54 | 54 | 54 |
| Zinc oxide | 5 | 5 | 5 |
| Stearic acid | 1 | 1 | 1 |
| Sulfur | 1.5 | 1.5 | 1.5 |
| p-Quinone dioxime | 6.0 | | |
| Lead dioxide | 8.0 | | |
| 5-Carbomethoxy-4-methyl-2-thiazolyl diethyldithiocarbamate | | 6.0 | |
| 5-Carbethoxy-4-methyl-2-thiazolyl diethyldithiocarbamate | | | 6.0 |

The compositions were cured by heating in a press for different periods of time at 330° F. The physical properties exhibited by the stocks at maximum cure were as follows:

Table I

| Stock | Max. Cure Time in Mins. | Modulus of Elasticity in lbs./in.$^2$ at Elongations of— | | Tensile at Break in lbs./in.$^2$ | Ultimate Elongation, Percent |
|---|---|---|---|---|---|
| | | 300% | 500% | | |
| A | 30 | | | 1,590 | 210 |
| B | 15 | 575 | 1,140 | 1,550 | 635 |
| C | 30 | 575 | 1,145 | 1,650 | 660 |

As a further embodiment of the invention, stocks were compounded comprising

| Stock | Parts by weight | |
|---|---|---|
| | D | E |
| Butyl rubber | 100 | 100 |
| Carbon black | 54 | 54 |
| Zinc oxide | 5 | 5 |
| Stearic acid | 1 | 1 |
| Sulfur | 1.5 | 1.5 |
| p-Quinone Dioxime | 6 | |
| $Pb_3O_4$ | 8 | |
| Mercaptobenzothiazole | | 0.5 |
| 5-Carbobutoxy-4-methyl-2-thiazolyl diethyldithiocarbamate | | 1.0 |

The compounded stocks were cured in the usual manner by heating in a press for different periods of time at 135°

C. The physical properties of the cured rubber products are set forth below:

Table II

| Stock | Cure Time in Mins. | Modulus of Elasticity in lbs./in.² at Elongations of— | | Tensile at Break in lbs./in.² | Ultimate Elongation, Percent |
|---|---|---|---|---|---|
| | | 300% | 500% | | |
| D | 30 | | | 1,595 | 270 |
| E | 30 | 855 | 1,450 | 1,515 | 550 |
| D | 60 | | | 1,595 | 280 |
| E | 60 | 930 | 1,540 | 1,540 | 500 |
| D | 90 | | | 1,445 | 250 |
| E | 90 | 890 | 1,460 | 1,550 | 600 |
| D | 120 | | | 1,540 | 240 |
| E | 120 | 845 | 1,410 | 1,570 | 635 |

It is intended to cover all changes and modifications of the examples of the invention herein chosen for purposes of disclosure which do not constitute departures from the spirit and scope of the invention.

What is claimed is:

1. A compound of the structure

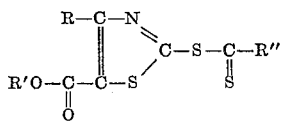

where R and R' are selected from a group consisting of hydrogen and hydrocarbon radicals containing less than 5 carbon atoms and R'' represents a secondary amino group containing less than 17 carbon atoms having the nitrogen attached to the C=S group.

2. A compound of the structure

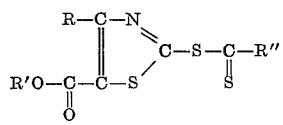

where R and R' represent alkyl radicals containing less than 5 carbon atoms and R'' represents a dialkylamino radical containing less than 6 carbon atoms in each alkyl group.

3. A compound of the structure

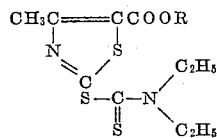

where R is an alkyl radical containing less than 5 carbon atoms.

4. A compound of the structure

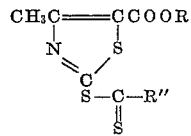

where R represents an alkyl radical containing less than 5 carbon atoms and R'' represents a dialkylamino radical containing less than 6 carbon atoms in each alkyl group.

5. A compound of the structure

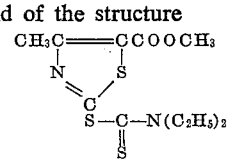

6. A compound of the structure

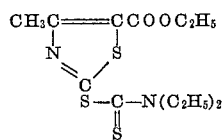

7. A compound of the structure

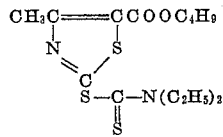

8. The process which comprises condensing a 5-carbalkoxy 4-alkyl-2-thiazolethiol of the structure

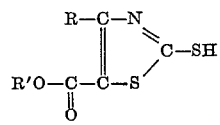

with a thiocarbamyl halide, hlg

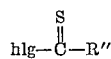

where R and R' are selected from a group consisting of hydrogen and hydrocarbon radicals containing less than 5 carbon atoms, hlg represents halogen and R'' represents a secondary amino group containing less than 17 carbon atoms.

9. The process which comprises condensing a 5-carbalkoxy 4-alkyl-2-thiazolethiol of the structure

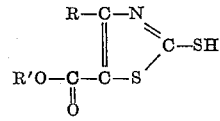

with N,N diethylthiocarbamyl chloride, where R and R' are selected from a group consisting of hydrogen and hydrocarbon radicals containing less than 5 carbon atoms.

10. The process which comprises condensing a compound of the structure

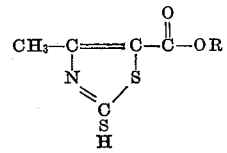

where R is an alkyl group of less than five carbon atoms with N,N-diethylthiocarbamyl chloride in aqueous alkaline medium.

References Cited in the file of this patent

UNITED STATES PATENTS 2,186,421    Mathes                Jan. 9, 1940